Oct. 5, 1954 — A. F. ORDAS — 2,691,113

DYNAMOELECTRIC MACHINE ROTOR

Filed Aug. 12, 1952

Inventor:
Arthur F. Ordas,
by Richard E. Hesley
His Attorney.

Oct. 5, 1954   E. D. LYKINS   2,691,114
GENERATOR BRUSH WITH CONDITION INDICATOR
Filed May 8, 1951
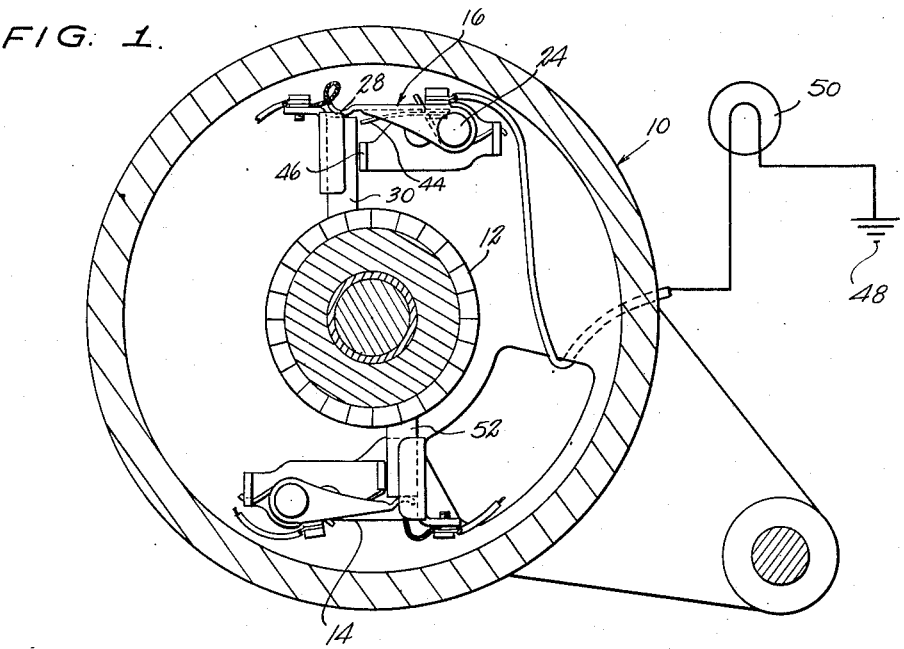
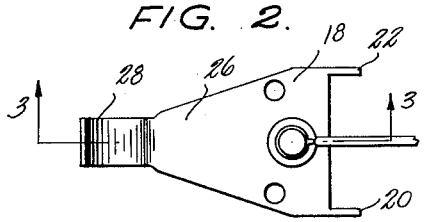
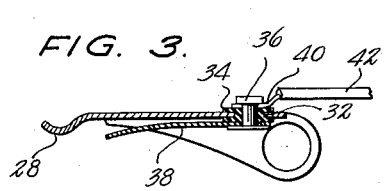
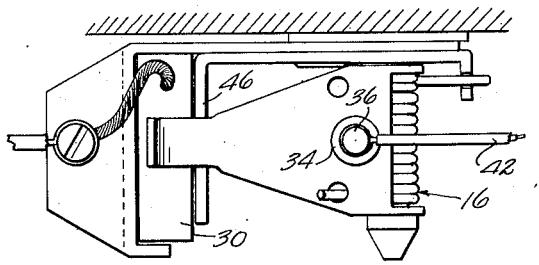
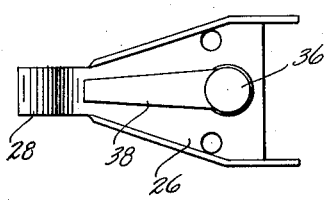
INVENTOR
EARL D. LYKINS,
BY
McMorrow, Berman + Davidson
ATTORNEYS Patented Oct. 5, 1954

2,691,113

UNITED STATES PATENT OFFICE 2,691,113

DYNAMOELECTRIC MACHINE ROTOR

Arthur F. Ordas, Toledo, Ohio, assignor to General Electric Company, a corporation of New York Application August 12, 1952, Serial No. 303,917

7 Claims. (Cl. 310—214)

My invention relates to dynamoelectric machine rotors and has particular significance in connection with wound salient pole type rotors.

Heretofore windings on salient pole type dynamoelectric machine rotors have been restrained radially by pole tips or shoes having lips peripherally overhanging the pole core body so that these lips may be relied upon to keep the pole coils in place and to overcome centrifugal force acting on the coils. One difficulty with this arrangement arises because the overhang is limited in order to prevent magnetic leakage between adjacent poles so that the area available for the copper of the coils is limited, and furthermore, field coil bracing often has to be used between coils with attendant disadvantages relating to expense of installation and interference with optimum operation.

It is an object of the present invention to provide simple and inexpensive means for overcoming the above-mentioned difficulties.

A further object of the present invention is to provide an improved dynamoelectric machine wound salient pole type rotor construction.

In accordance with the illustrated embodiment of my invention, I increase the copper area available on such types of rotors by interspacing non-magnetic punchings between magnetic laminations which make up the main body and magnetic pole tips of each pole piece. In the pole tip areas the non-magnetic punchings have a greater overhang than the magnetic laminations to provide restraint against centrifugal force for a washer, or the like, defining the top of an enlarged winding space for each pole. The greater amount of winding about each pole thus made possible allows control of transient reactance, or allows the same sized machine to have a greater rating, or to run cooler, or all three, and also allows adjacent coils to be separated by a small strip of insulation eliminating the need for the more complicated field coil bracing which has heretofore been used, particularly for high speed applications.

Other objects and advantages will become apparent and my invention may be better understood by reference to the following description taken in connection with the accompanying drawing in which.

Figure 1:
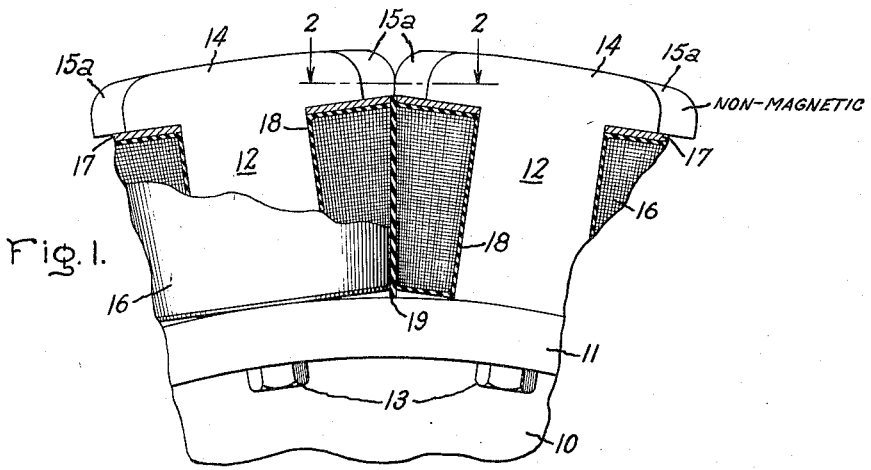
Fig. 1 is a fragmentary elevational section of a dynamoelectric machine rotor showing wound pole pieces constructed in accordance with the invention.
Figure 2:
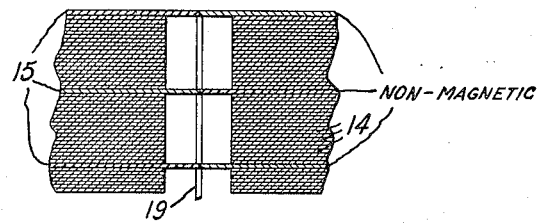
Fig. 2 is a section on the line 2—2 of Fig. 1.

Referring to Figs. 1 and 2, I have shown a portion of a rotor for a dynamoelectric machine of the synchronous type assumed to have an A. C. distributed stator winding (not shown) and a D. C. excited salient pole rotatable field. The rotor has a supporting spider or web 10 adapted to be mounted on a suitable shaft and provided with a circumferentially extending flange 11 of magnetic material on which pole pieces 12 are secured as by bolts 13. The pole pieces 12 are each formed of a plurality of laminations, with the plurality comprising groups of magnetic material (e. g., ferritic) laminations 14 and interspersed individual punchings 15 of a non-magnetic material such as copper, aluminum or stainless steel. At the pole tips, the magnetic laminations have an overhang (14a) limited in peripheral extent to prevent magnetic leakage between adjacent poles which are of unlike polarity, while the non-magnetic punchings have a greater overhang (15a) in order to retain large pole piece coils and to serve other objects as hereafter more fully explained.

Metallic (or insulating material) collars 17 are provided one on each pole piece 12 to provide continuity axially between overhanging lips 15a. The coils 16 are field exciting windings arranged about each pole piece and insulated therefrom by suitable insulation 18 which may be a thermoset insulating material applied originally (before the coil is wound) as a non-flowing plastic mass and in any convenient manner as by dipping, or spraying, or spreading with a trowel. The finished coils are separated by strip insulation 19.

Figure 3:
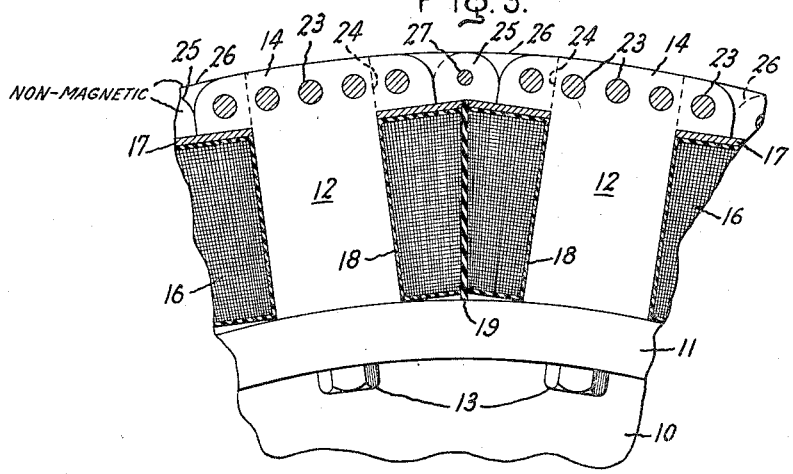
Fig. 3 illustrates a modification.

In Fig. 3 like parts are numbered as before but the pole tips are shown provided with openings containing amortisseur winding bars 23 which may be of copper. In the construction of Fig. 3 it may be assumed that magnetic laminations 14 are shaped outwardly as before and there are interspersed flat sided laminations 24 of magnetic material so that the flux density of each pole piece will not be raised by the expedient previously described of interspersing with laminations of non-magnetic material. In the arrangement of Fig. 3 there are overlapping non-magnetic tips 25—26 each of which at one end abuts a straight side of a lamination 24. Tips 25—26 are held in place by the endmost ones of the damper winding bars 23 and also by a rod 27 extending through the tips oppositely extending from adjacent pole pieces and overlapping the center line between poles.

With either of the arrangements above-described, the non-magnetic punchings or plates or tips will desirably be sufficient in number to rigidly restrain the coils against centrifugal force. If they are of a metal they will have relatively high heat conductivity and, since at the tips they are spaced apart and act as fins in a high air velocity area, they serve as efficient heat transfer agents to cool the field cores and coils. The arrangement of the invention affords a new freedom of design since large field coil copper space is available regardless of other design limitations such as a low transient reactance requirement dictating relatively short magnetically active pole tips, and additional advantages accrue because the new arrangement allows air flow to be more uniform, the fins provide excellent locations for balancing weights when required, and any of the conductive material non-magnetic laminations can readily be brazed to the amortisseur bars to serve as end rings therefor.

While I have illustrated and described particular embodiments of my invention, modifications thereof will obviously occur to those skilled in the art. I, therefore, desire it to be understood that my invention is not to be limited to the particular arrangements described and I intend in the appended claims to cover all modifications which do not depart from the true spirit and scope of my invention.

What I claim as new and desire to secure by Letters Patent of the United States is:

1. A dynamoelectric machine rotor having a central spider, pole pieces comprising laminations extending radially outward from said spider and comprising groups of laminations of magnetic material and interspersed punchings of non-magnetic material with the magnetic laminations having portions extending circumferentially at the periphery to form pole tips having their ends separated a predetermined peripheral distance between adjacent poles according to desired magnetic characteristics of the machine, and the non-magnetic punchings extending circumferentially further in the peripheral direction than said pole tips to form pole tip extensions separated a lesser distance between adjacent poles to define adjacent each pole a winding space greater in peripheral extent than the extent of the magnetic material lamination pole tips.

2. In combination, a rotary field member having salient poles and field coils thereon with each pole comprising a plurality of magnetic material laminations outwardly flared in a peripheral direction to provide pole tips, a plurality of interspersed straight-sided magnetic material laminations, and non-magnetic material tips abutting said straight-sided laminations and interleaved between the magnetic material pole tips and extending circumferentially therebeyond and overlapping one another between pole pieces, and means for holding together all of the laminations and tips in each pole piece and between each pair of adjacent pole pieces, with said field coils substantially filling the spaces between poles.

3. A wound rotor for a salient pole dynamoelectric machine having a central spider comprising a plurality of salient poles formed of magnetic laminations projecting radially outward from said spider, said laminations having peripheral extensions forming pole tips and defining with said poles winding spaces about each pole body, each of said pole tips being separated a predetermined distance from adjacent pole tips according to the desired magnetic characteristics of the machine, windings in said winding spaces, and means comprising a plurality of laminations of non-magnetic material interleaved with said laminated pole pieces and having pole tips extending in a peripheral direction further than said magnetic pole tips for restraining said windings against movement outwardly under the influence of centrifugal force whereby a greater portion of the space between adjacent poles can be filled with windings.

4. A wound rotor for a salient pole dynamoelectric machine having a central spider comprising a plurality of salient pole pieces formed of magnetic laminations and projecting radially outward from said spider, said laminations having peripheral extensions at the outer ends thereof forming pole tips defining with said pole pieces winding spaces about each pole, windings in said winding spaces having a portion extending in a peripheral direction beyond said pole tips, and means for increasing the peripheral extent of said winding spaces comprising a plurality of laminations of non-magnetic material interleaved with the magnetic laminations of said pole pieces, said non-magnetic laminations having tip portions being separated a lesser distance from adjacent poles than the pole tips of said magnetic laminations for restraining the outward movement of the winding portions extending beyond the peripheral ends of the magnetic laminations.

5. A wound rotor for a salient pole dynamoelectric machine having a central spider comprising a plurality of laminated salient pole pieces formed of magnetic material and projecting radially outward from said spider, peripheral extensions of magnetic material on said pole pieces forming pole tips and defining winding spaces about each pole body of a predetermined peripheral extent, and means for increasing the peripheral extent of said winding spaces comprising a plurality of punchings of non-magnetic material forming tip portions extending in a peripheral direction interleaved with said magnetic pole tips, said non-magnetic tip portions being separated a lesser distance from adjacent poles than said magnetic pole tips to define adjacent each pole a winding space greater in peripheral extent than is defined by said magnetic pole tips.

6. A wound rotor for a salient pole dynamoelectric machine having a central spider comprising a plurality of laminated salient pole pieces formed of magnetic material and projecting radially outward from said spider, peripheral extensions of magnetic material on said pole pieces forming pole tips and defining with said pole pieces winding spaces about each pole body of a predetermined peripheral extent, and means for increasing the peripheral extent of said winding space for each pole piece comprising a plurality of punchings of non-magnetic material forming tip portions extending in a peripheral direction interleaved with said laminated pole pieces, said non-magnetic tip portions of one pole piece respectively joining similar portions of adjacent pole pieces to define winding spaces substantially filling the entire space between the poles.

7. In a wound rotor for a dynamoelectric machine having a central spider, a salient pole comprising a plurality of magnetic laminations projecting radially outward from said spider, said laminations having circumferential extensions forming pole tips at the outer ends thereof and defining with the radially projecting portion a winding space about each pole, said pole tips projecting in a circumferential direction a predetermined distance, and means comprising a plurality of laminations of non-magnetic material interleaved with said magnetic laminations and having pole tips extending in a circumferential direction a greater distance than said magnetic pole tips to increase the circumferential extent of the winding space about said pole.

References Cited in the file of this patent

UNITED STATES PATENTS

| Number | Name | Date |
|---|---|---|
| 1,545,733 | Brinton | July 14, 1925 |

FOREIGN PATENTS

| Number | Country | Date |
|---|---|---|
| 459,295 | Great Britain | Jan. 5, 1937 |
| 607,783 | Great Britain | Sept. 6, 1948 |